(12) United States Patent
Iijima et al.

(10) Patent No.: US 10,715,070 B2
(45) Date of Patent: Jul. 14, 2020

(54) MOTOR DRIVING DEVICE AND METHOD FOR MEASURING PHASE CURRENT IN MOTOR DRIVING DEVICE

(71) Applicant: HITACHI AUTOMOTIVE SYSTEMS, LTD., Hitachinaka-shi, Ibaraki (JP)

(72) Inventors: Fumiya Iijima, Isesaki (JP); Tomonobu Koseki, Isesaki (JP); Tomishige Yatsugi, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/083,853

(22) PCT Filed: Aug. 24, 2016

(86) PCT No.: PCT/JP2016/074599
§ 371 (c)(1),
(2) Date: Sep. 10, 2018

(87) PCT Pub. No.: WO2017/154239
PCT Pub. Date: Sep. 14, 2017

(65) Prior Publication Data
US 2019/0068098 A1    Feb. 28, 2019

(30) Foreign Application Priority Data

Mar. 11, 2016   (JP) .................................. 2016-048451

(51) Int. Cl.
*H02P 21/22* (2016.01)
*H02P 27/08* (2006.01)
(Continued)

(52) U.S. Cl.
CPC .......... *H02P 21/22* (2016.02); *H02M 7/5395* (2013.01); *H02P 21/18* (2016.02); *H02P 27/08* (2013.01);
(Continued)

(58) Field of Classification Search
CPC ........ H02P 27/08; H02P 6/18; H02M 7/5395; H02M 2001/0009; H02M 7/53871
See application file for complete search history.

(56) References Cited

U.S. PATENT DOCUMENTS

2009/0052215 A1\*   2/2009   Watanabe ......... H02M 7/53873
363/131
2009/0263260 A1   10/2009   Goto et al.
(Continued)

FOREIGN PATENT DOCUMENTS

JP    2008-061486 A    3/2008
JP    2009-118622 A    5/2009
(Continued)

*Primary Examiner* — Shawki S Ismail
*Assistant Examiner* — Zoheb S Imtiaz
(74) *Attorney, Agent, or Firm* — Foley & Lardner LLP

(57) ABSTRACT

The present invention relates to a motor driving device and a method for measuring a phase current in a motor driving device, and specifically relates to a technique of measuring three phase currents of a three-phase brushless motor using a current sensor for measuring the DC bus current in the inverter. The control unit according to the present invention shifts a pulse phase of a PWM pulse such that pulse phases of the three phase PWM pulses in a first PWM cycle of the PWM control differ from those in a second PWM cycle of the PWM control, and measures the three phase currents from the output of the current sensor in these two first and second PWM cycles. The control unit calculates an offset error of the current sensor from these three phase current measurements and learns a correction value used for per- (Continued)

forming offset correction on the electric-current measurement.

7 Claims, 10 Drawing Sheets

(51) Int. Cl.
*H02P 21/18* (2016.01)
*H02M 7/5395* (2006.01)
*H02M 1/00* (2006.01)

(52) U.S. Cl.
CPC ... *H02P 27/085* (2013.01); *H02M 2001/0009* (2013.01)

(56) References Cited

U.S. PATENT DOCUMENTS

| | | | | |
|---|---|---|---|---|
| 2015/0061554 A1* | 3/2015 | Kuratani | .................. | H02P 6/28 318/400.04 |
| 2016/0248354 A1* | 8/2016 | Liu | ......................... | H02P 6/18 |
| 2016/0254760 A1* | 9/2016 | Zhang | ................. | H02M 7/5395 363/95 |

FOREIGN PATENT DOCUMENTS

| | | |
|---|---|---|
| JP | 2013-066340 A | 4/2013 |
| JP | 2013-251971 A | 12/2013 |
| JP | 2015-178328 A | 10/2015 |

\* cited by examiner

MOTOR DRIVING DEVICE AND METHOD FOR MEASURING PHASE CURRENT IN MOTOR DRIVING DEVICE

TECHNICAL FIELD

The present invention relates to a motor driving device and a method for measuring a phase current of a motor driving device, and specifically relates to a technique of measuring three phase currents of a three-phase brushless motor from the output of a current sensor for measuring the DC bus current in the inverter.

BACKGROUND ART

Patent Document 1 discloses a motor controller having the following features. The motor controller includes an inverter and a single-shunt current sensor circuit that has an A/D converting unit and is connected to either the power-supply terminal or ground terminal of the inverter. The motor controller has a function of fixing the reference positions of the U-, V-, W-phase duty command values individually in the first, middle and last portions of each carrier cycle, and shifting each of these U-, V-, W-phase duty command values in a predetermined direction. The motor controller establishes the phase current measuring timings individually for measuring and A/D converting the U-, V-, W-phase currents of the motor such that each phase current measuring timing is fixed in the corresponding portion of the carrier cycle.

REFERENCE DOCUMENT LIST

Patent Document

Patent Document 1 JP 2013-251971 A

SUMMARY OF THE INVENTION

Problem to be Solved by the Invention

Here, the current sensor for measuring the DC bus current in the inverter includes an operational amplifier. Its offset voltage fluctuates depending on the ambient temperature and/or the like, and such fluctuation in the offset voltage causes an offset error in the electric-current measurement the current sensor. Here, the offset error is included in each of the three phase current measurements and the sum of the actual three phase currents is zero. Thus, when the three phase currents are measured using the current sensor, the offset error in the electric-current measurement due to a temperature change may be calculated based on these three phase current measurements. After that, by performing offset correction to correct the electric-current measurement to compensate for the calculated offset error, the phase current measurement accuracy is maintained despite temperature change, and the accuracy in controlling the motor torque is maintained.

However, the above conventional method, in which the reference positions of the three phase duty command values are fixed individually in the predetermined portions of each carrier cycle, and the three phase currents are measured at the phase current measuring timings fixed individually in the predetermined portions, may fail to obtain all the three phase current measurements, which are necessary to determine the offset error. This is because, depending on the duty command values, the conventional method may fail to obtain any of the three phase current measurements or may provide only an insufficient period for phase current measuring. Thus, when phase currents are measured by a method in which the reference positions of the three phase duty command values are fixed individually in predetermined portions of each carrier cycle, the offset error may be measured (the offset correction variable may be updated) at a lower frequency. Therefore, such a conventional method may be incapable of changing the offset correction variable responsively to the change in the ambient temperature, and may provide only poor phase current measurement accuracy.

The present invention has been made in view of the above problem. An object of the present invention to provide a motor driving device and a method for measuring a phase current in a motor driving device that are capable of providing more opportunities to measure all the three phase currents.

Means For Solving the Problem

To this end, a motor driving device according to an aspect of the present invention includes an inverter for supplying an AC power to a three-phase brushless motor; a current sensor for measuring a DC bus current in the inverter; and a control unit which receives an output of the current sensor and performs PWM control on the inverter, in which the control unit includes phase current sensing means for measuring three phase currents from the output of the current sensor, each phase current being measured when a combination of on and off of three phase PWM pulses is a predetermined combination, and the phase current sensing means includes a first sensing means for performing pulse shifting to shift a pulse phase of a PWM pulse such that pulse phases of the three phase PWM pulses in a first PWM cycle of the PWM control differ from those in a second PWM cycle of the PWM control, and for measuring the three phase currents from the output of the current sensor in these two first and second PWM cycles.

According to another aspect of the present invention, a method for measuring a phase current in a motor driving device including an inverter for supplying an AC power to a three-phase brushless motor, and a current sensor for measuring a DC bus current in the inverter, the inverter being controlled by PWM control, includes a first step of performing pulse shifting to shift a pulse phase of a PWM pulse in a first PWM cycle of the PWM control to generate one or two phase current measurement periods for measuring one or two phase currents in the first PWM cycle; a second step of measuring the one or two phase currents from an output of the current sensor in the one or two phase current measurement periods generated in the first PWM cycle; a third step of performing pulse shifting to shift a pulse phase of a PWM pulse in a second PWM cycle of the PWM control to generate two or one phase current measurement periods for measuring remaining two or one phase currents in the second PWM cycle; and a fourth step of measuring the remaining two or one phase currents from an output of the current sensor in the two or one phase current measurement periods generated in the second PWM cycle.

Effects of the Invention

According to the aspects of the invention described above, more opportunities to measure all the three phase currents can be provided than when the pulse phases of the PWM pulses are fixed. When the present invention is applied to offset correction of the electric-current measurement that is performed to compensate for its offset error calculated from the three phase current measurements, the offset correction value can be updated at a higher frequency and the offset correction value can be calculated with higher accuracy.

MODE FOR CARRYING OUT THE INVENTION

Figure 1:
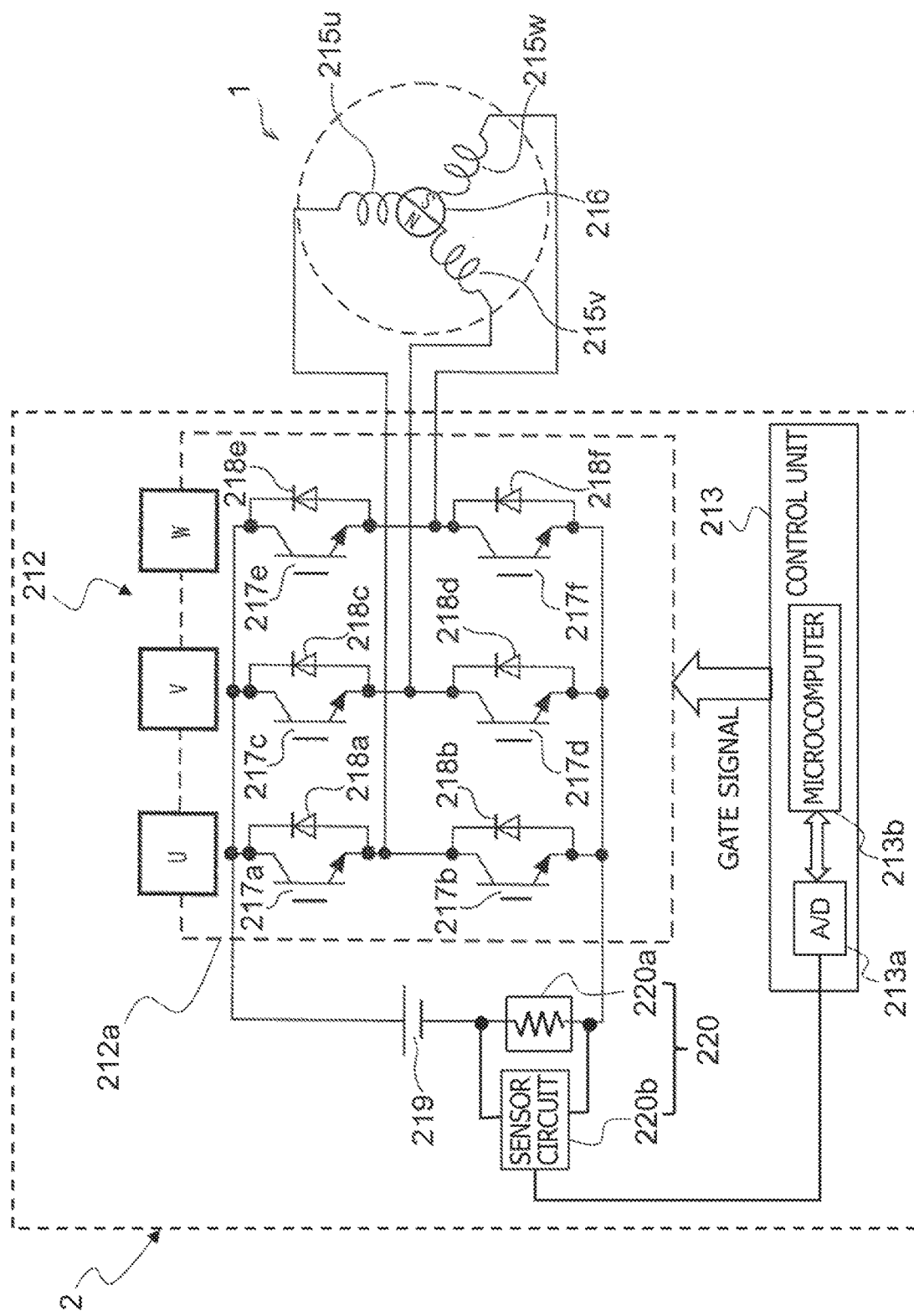
FIG. 1 is a circuit diagram illustrating a driver circuit and a three-phase brushless motor according to an embodiment of the present invention.

An embodiment of the present invention will be described below. FIG. 1 is a circuit diagram illustrating an example of a three-phase brushless motor 1 and a motor driving device 2. Three-phase brushless motor 1 illustrated in FIG. 1 is used, for example, as an electric actuator for generating a steering assist torque in an electric power steering apparatus of a vehicle, or as an electric actuator for driving various pumps of a vehicle.

Motor driving device 2 for driving three-phase brushless motor 1 includes a driver circuit 212 and a control unit 213. Control unit 213 includes an A/D converter 213a and a microcomputer 213b. Microcomputer 213b includes a microprocessor such as a CPU or an MPU, and memory devices such as a ROM and a RAM. Three-phase brushless motor 1 is a three-phase DC brushless motor including a cylindrical stator (not illustrated in the drawings), a permanent magnet rotor 216, and star-connected three-phase coils, which are a U-phase coil 215u, a V-phase coil 215v, and a W-phase coil 215w. U-, V-, W-phase coils 215u, 215v, 215w are provided in the stator. Rotor 216 is rotatably disposed in a space defined in a center portion of the stator.

Three-phase brushless motor 1 does not include any sensor for measuring absolute position of rotor 216. Control unit 213 controls the drive of three-phase brushless motor 1 by a sensorless drive method without using any sensor for measuring absolute position of rotor 216. Alternatively, however, three-phase brushless motor 1 may include a magnetic pole position sensor, and control unit 213 may control the drive of three-phase brushless motor 1 based on the angle of rotor 216 (magnetic pole position) measured using the output of the magnetic pole position sensor.

Driver circuit 212 has an inverter 212a and a DC power supply circuit 219. Inverter 212a includes three-phase bridge-connected switching elements 217a to 217f. Switching elements 217a to 217f include antiparallel diodes 218a to 218f, respectively. Inverter 212a supplies an AC power to three-phase brushless motor 1. Each of switching elements 217a to 217f of inverter 212a is formed of a field effect transistor (FET), for example. The control terminals (gate terminals) of switching elements 217a to 217f are connected to the output port of control unit 213. Control unit 213 controls the on and off of switching elements 217a to 217f.

Control unit 213 controls a voltage applied to three-phase brushless motor 1 by controlling the on and off of switching elements 217a to 217f of inverter 212a by triangular-wave comparison pulse width modulation (PWM). In the triangular-wave comparison PWM control, control unit 213 determines timing for turning on or off each of switching elements 217a to 217f by comparing a triangular wave (carrier) with a PWM timer that is set based on a command duty ratio (command pulse voltage), i.e., determines timing for causing each PWM pulse to rise and fall. Here, the PWM pulses act as control signals for the three-phase switching elements. Control unit 213 performs the PWM control on switching elements 217a to 217f of inverter 212a by a complementary PWM method. In the complementary PWM method, for each of the U, V, and W phases, the pulse phase of the PWM pulse for controlling the on and off of an upper-arm switching element is opposite to that for controlling the on and off of a lower-arm switching element.

A current sensor 220 for measuring the DC bus current in inverter 212a is provided between the ground terminal of power supply circuit 219 and the U-, V-, W-phase lower arms (switching elements 217b, 217d, 217f). Current sensor 220 includes a shunt resistor 220a and a sensor circuit 220b. Shunt resistor 220a is connected in series between the ground terminal of power supply circuit 219 and the U-, V-, W-phase lower arms. Sensor circuit 220b includes an operational amplifier and the like. Sensor circuit 220b measures a voltage proportional to the current generated by the resistance of shunt resistor 220a, and outputs an analog signal corresponding to this voltage.

The analog signal (signal indicating a DC bus current measurement) from sensor circuit 220b is A/D converted by A/D converter 213a and read into microcomputer 213b. Control unit 213 determines the three-phase command voltages Vu, Vv, Vw by, for example, a vector control method based on a rotor position and a command torque, and performs PWM control on inverter 212a based on these command voltages.

Control unit 213 receives the output of current sensor 220 and measures the three phase currents based on this output. Also, control unit 213 performs vector control using the three phase current measurements. Current sensor 220, which is configured to measure the DC bus current in inverter 212a, can measure one of the U-, V-, W-phase currents depending on the on/off combinations of the U-, V-, W-phase PWM pulses. Using this, control unit 213 measures the three phase currents from the output of current sensor 220.

For example, when the U-phase upper arm is on and the V-, W-phase upper arms are off, the current having flowed through the U phase is divided between the V and W phases. Under this condition, current sensor 220 measures a U-phase current Iu. On the other hand, when the U-, V-phase upper arms are on and the W-phase upper arm is off, the current having flowed through the U phase and the current having flowed through the V phase join together and flow through the W phase. Under this condition, current sensor 220 measures a W-phase current Iw. In this way, when the PWM pulse phases corresponding to one or two of the U-, V-, W-phase upper arms are on, the output of current sensor 220 represents one of the U-, V-, W-phase currents depending on which one or two of the PWM pulse phases are on. Using such characteristics, control unit 213 measures the three phase currents based on the output of current sensor 220, and performs PWM control using these phase current measurements.

Figure 2:
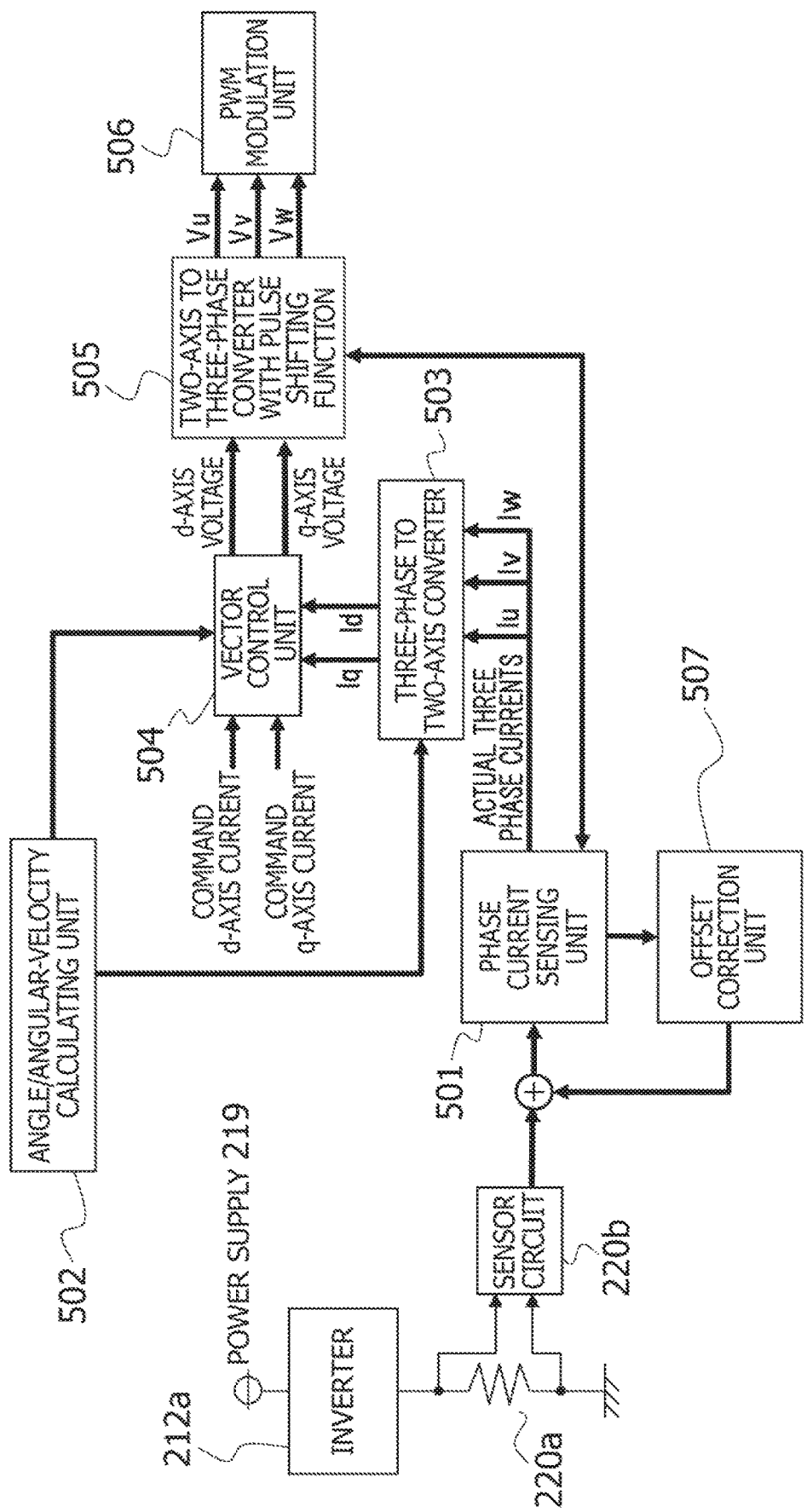
FIG. 2 is a functional block diagram regarding PWM control of the three-phase brushless motor according to an embodiment of the present invention.

FIG. 2 is a functional block diagram of control unit 213 for illustrating processing for setting the three-phase command voltages Vu, Vv, Vw by the vector control method. In FIG. 2, a phase current sensing unit 501 (phase current sensing means) measures the three phase currents Iu, Iv, Iw based on the A/D converted value of the output of sensor circuit 220b, i.e., based on the DC bus current in inverter 212a. In other words, phase current sensing unit 501 specifies a period during which one or two of the U-, V-, W-phase upper arms are on in the PWM pulse as a phase current measurement period, and identifies one of the U-, V-, W-phase currents to be measured in this phase current measurement period, based on which one or two of the U-, V-, W-phase upper arms are on in this period.

Then, phase current sensing unit 501 establishes a phase current measuring timing (timing for sampling the A/D converted value of the output of sensor circuit 220b) within this phase current measurement period. Phase current sensing unit 501 samples the output of current sensor 220 at this phase current measuring timing, and calculates an electric-current value from the sampled value. Phase current sensing unit 501 outputs this calculated electric-current value as the measurement of the currently-identified target phase current among the U-, V-, W-phase currents. An angle/angular-velocity calculating unit 502 estimates the motor angle (magnetic pole position) and angular velocity (motor rotation speed).

When control unit 213 performs PWM control on three-phase brushless motor 1 by the sensorless drive method, angle/angular-velocity calculating unit 502 estimates the rotor position based on the counter electromotive force of the motor, and calculates the angular velocity based on the estimated rotor position. On the other hand, when three-phase brushless motor 1 includes the magnetic pole position sensor, angle/angular-velocity calculating unit 502 measures the rotor position using the output of the magnetic pole position sensor, and calculates the angular velocity based on the measured rotor position.

A three-phase to two-axis converter 503 converts the phase current measurements Iu, Iv, Iw that are output by phase current sensing unit 501 into actual currents Id, Iq in a two-axis rotation coordinate system (d-q coordinate system) based on the current motor angle (magnetic pole position) θ. A vector control unit 504 receives the d-axis and q-axis command currents corresponding to the command torque, the angular velocity calculated by angle/angular-velocity calculating unit 502, and the actual currents Id, Iq in the d-q coordinate system calculated by three-phase to two-axis converter 503.

Based on the d-axis and q-axis command currents, the angular velocity, and the actual currents Id, Iq, vector control unit 504 determines command voltages Vq, Vd in the d-q coordinate system. Vector control unit 504 outputs the thus-determined command voltages Vq, Vd to a two-axis to three-phase converter 505. Two-axis to three-phase converter 505 converts the command voltages Vq, Vd that are output by vector control unit 504 into three-phase command voltages Vu, Vv, Vw and outputs them to a PWM modulation unit 506.

Two-axis to three-phase converter 505 has a pulse shifting function for shifting the PWM pulses back and forth by correcting the command voltages Vu, Vv, Vw. Here, in each PWM pulse as generated, the pulse center is located at the valley of the triangular wave carrier. This pulse shifting, which is performed to secure a sufficient phase current measurement period, will be described in detail later. PWM modulation unit 506 determines timings for causing the switching gate waveforms (PWM pulses) for driving the U-, V-, W-phase switching elements (upper and lower arms) to rise and fall by comparing the triangular wave carrier and the three-phase command voltages Vu, Vv, Vw, which are used as the modulated waves. PWM modulation unit 506 outputs the switching gate waveforms to the control terminals (gate terminals) of switching elements 217a to 217f of inverter 212a.

Specifically, PWM modulation unit 506 compares the U-phase command voltage Vu with the triangular wave carrier. When the U-phase command voltage Vu is above the triangular wave carrier, PWM modulation unit 506 sets the switching gate waveform (PWM pulse) for driving the U-phase upper arm (switching element 217a) to its high level. When the U-phase command voltage Vu is below the triangular wave carrier, PWM modulation unit 506 sets the switching gate waveform (PWM pulse) for driving the U-phase upper arm (switching element 217a) to its low level.

In addition, PWM modulation unit 506 inverts the switching gate waveform (PWM pulse) for driving the U-phase upper arm (switching element 217a) to generate a switching gate waveform (PWM pulse) for driving the U-phase lower arm (switching element 217b). In the same manner, PWM modulation unit 506 also generates switching gate waveforms (PWM pulses) for driving the V-phase upper and lower arms and switching gate waveforms (PWM pulses) for driving the W-phase upper and lower arms.

Control unit 213 further includes an offset correction unit (offset correction means) 507 for correcting an offset error of current sensor 220. Based on the three phase currents Iu, Iv, Iw measured based on the output of current sensor 220 by phase current sensing unit 501, offset correction unit 507 determines the offset error of current sensor 220. Then, offset correction unit 507 determines an offset correction variable based on this offset error, and corrects the electric-current value measurement of current sensor 220 based on this offset correction variable.

Next, processing for measuring the phase currents performed by phase current sensing unit 501 will be described in detail. To obtain the three phase current measurements based on the DC bus current in inverter 212a, it is only necessary to measure two phase currents from the output of current sensor 220. The remaining one phase current may be calculated based on the fact that the sum of the three phase currents is zero. Vector control unit 504 can calculate the command voltages Vq, Vd from the two phase current measurements from the output of current sensor 220 and the remaining one phase current value calculated based on these measurements.

However, to measure the offset error of current sensor 220, phase current sensing unit 501 has to measure all the three phase currents from the output of current sensor 220 for the following reason. When the offset voltage of the operational amplifier constituting current sensor 220 fluctuates due to a change in the ambient temperature or the like, an offset error occurs in the electric-current measurement of current sensor 220. This offset error is included in each of the three phase current measurements, and the sum of the three phase current measurements deviates from zero.

Here, the difference between zero and the sum of phase current measurements is equal to the sum of the offset errors included in these three phase current measurements. Thus, the offset error included in each of the three phase current measurements can be calculated from this difference. For this reason, to obtain the offset error, phase current sensing unit 501 measures all the three phase currents from the output of current sensor 220, and outputs these three phase current measurements to offset correction unit 507. In response, offset correction unit 507 calculates the offset error from the sum of the three phase current measurements, determines an offset correction variable based on the thus-calculated offset error, and stores this offset correction variable in the memory. Based on the correction variable stored in the memory, offset correction unit 507 performs offset correction on the electric-current measurement of current sensor 220.

Figure 3:
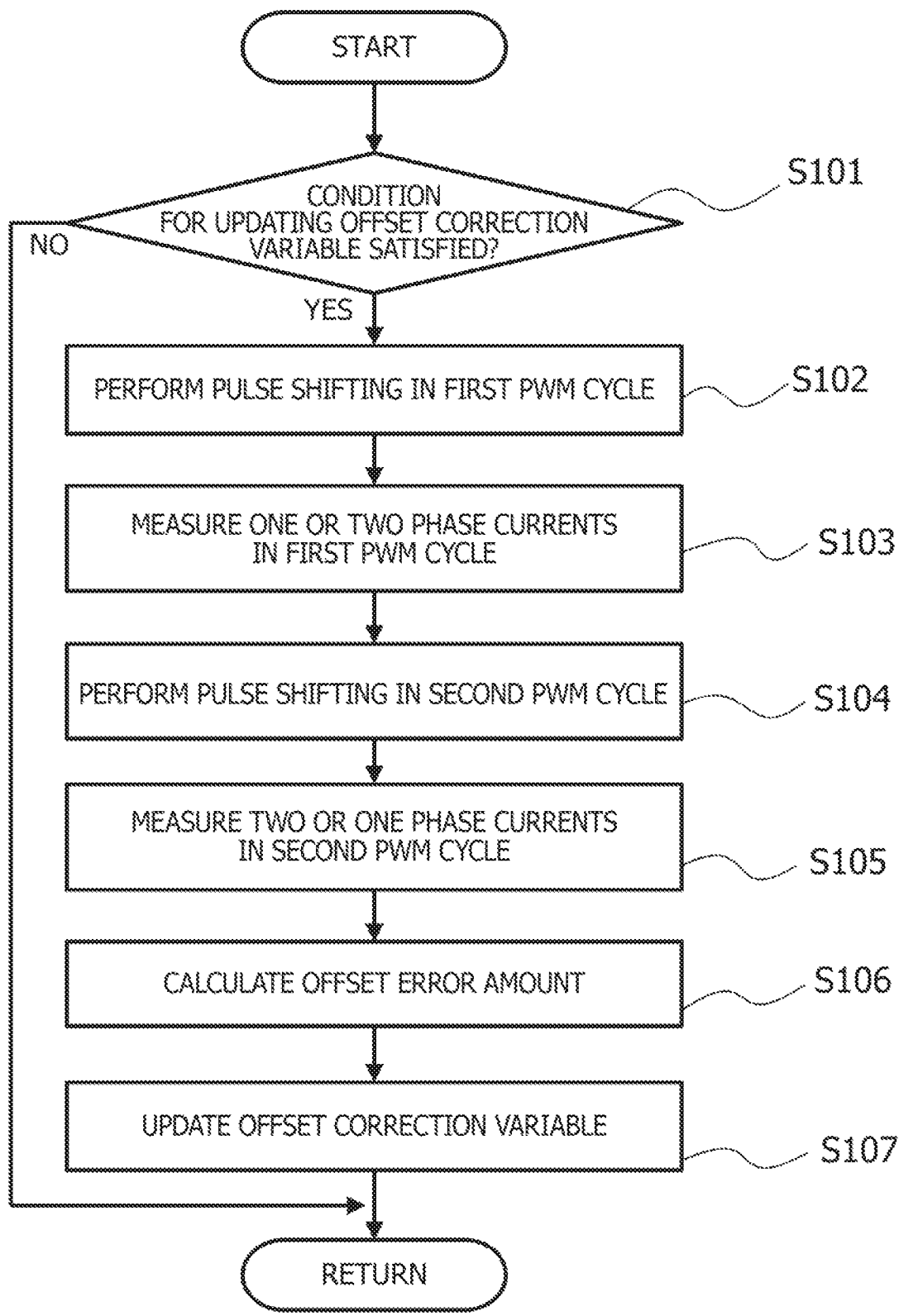
FIG. 3 is a flowchart illustrating processing for learning an offset correction value according to an embodiment of the present invention.

Below, processing for measuring the phase currents performed by control unit 213 (phase current sensing unit 501) will be described in detail. The flowchart of FIG. 3 illustrates an interrupt routine executed by control unit 213 at predetermined time intervals.

First, in step S101, control unit 213 determines whether or not the condition for updating the offset correction variable is satisfied. For example, the condition for such updating may be satisfied when the length of time elapsed from the last updating session exceeds a predetermined value, and/or when there is no fault in current sensor 220, inverter 212a, or the like.

When control unit 213 determines that the condition for updating the offset correction variable is satisfied, the operation proceeds to step S102. In step S102, control unit 213 performs pulse shifting in the first PWM cycle of the PWM control. Specifically, control unit 213 shifts any of the pulse phases of the PWM pulses in the first PWM cycle back and forth such that two or one phase currents can be measured in the first PWM cycle. In this way, control unit 213 generates two or one phase current measurement periods in the first PWM cycle such that two or one phase currents can be measured from the output of current sensor 220 in these phase current measurement periods. Note that, in the routine illustrated in the flowchart of FIG. 3, the three phase currents are measured in two cycles of the PWM control, as will be described later. As used herein, among each such two successive cycles of the PWM control, the earlier cycle is referred to as the first PWM cycle, and the later cycle immediately after the first PWM cycle is referred to as the second PWM cycle.

Then, the operation proceeds to step S103, in which control unit 213 establishes the phase current measuring timing within each phase current measurement period that has been generated as a result of pulse shifting in step S102. Control unit 213 measures two or one phase currents by sampling the output of current sensor 220 at the phase current measuring timing(s). When control unit 213 has measured the phase current(s) in the first PWM cycle, the operation proceeds to step S104. In step S104, control unit 213 performs pulse shifting in the second PWM cycle, which comes immediately after the first PWM cycle, using a pulse shifting pattern that differs from that for the first PWM cycle. Specifically, control unit 213 generates one or two phase current measurement periods in the second PWM cycle such that the remaining one or two phase currents that are not measured in the first PWM cycle can be measured from the output of current sensor 220 in these phase current measurement periods.

In other words, control unit 213 performs pulse shifting such that the pulse phases of the three phase PWM pulses in the first PWM cycle can differ from those in the second PWM cycle, and thus such that some of the U-, V-, W-phase currents can be measured in the first PWM cycle, and the other(s) can be measured in the second PWM cycle. Then, the operation proceeds to step S105, in which control unit 213 establishes the phase current measuring timing within each phase current measurement period that has been generated as a result of pulse shifting in step S104. Control unit 213 measures one or two phase currents by sampling the output of current sensor 220 at the phase current measuring timing(s).

Through the above-described processing in steps S102 to S105 (performed by the first sensing means), control unit 213 measures three phase currents Iu, Iv, Iw from the output of current sensor 220 in two PWM cycles. As described above, in this embodiment, pulse shifting is performed individually in the first and second PWM cycles, and all the three phase currents are measured in these two PWM cycles, that is, in the first and second PWM cycles. This allows the three phase currents to be measured in various patterns of the PWM pulses, and improves the frequency of measuring the offset error. After that, the operation proceeds to step S106, in which control unit 213 divides the sum of the phase current measurements Iu, Iv, Iw by three, and uses the value of the division as the offset error amount $\Delta I(\Delta I=(Iu+Iv+Iw)/3)$.

Assume here that the actual phase current values are represented by Iuo, Ivo, Iwo. Then, since the offset error amount $\Delta I$ of current sensor 220 due to a temperature change or the like is included equally to each phase current measurement Iu, Iv, Iw, the phase current measurements are represented by Iuo+$\Delta I$, Ivo+$\Delta I$, Iwo+$\Delta I$. Since Iuo+Ivo+Iwo=0, the sum of these measurements is $\Delta I \times 3$(Iuo+$\Delta I$+Ivo+$\Delta I$+Iwo+$\Delta I$=$\Delta I \times 3$). This is the reason the offset error amount $\Delta I$ may be obtained by dividing the sum of the phase current measurements Iu, Iv, Iw by three.

When control unit 213 has calculated the offset error amount $\Delta I$, the operation proceeds to step S107. In step S107, based on the offset error amount $\Delta I$, control unit 213 updates the offset correction variable to be used in offset correction of the electric-current measurement of current sensor 220. Here, the phase current measurements Iu, Iv, Iw used in step S106 may have already undergone onset correction. In this case, since the value of the offset error amount $\Delta I$ calculated in S107 this time corresponds to the amount of variation in the offset error amount $\Delta I$, control unit 213 changes the offset correction variable by this amount of variation in the offset error amount $\Delta I$, in step S107.

Note that control unit 213 may repeatedly calculate the offset error amount $\Delta I$ and calculate the average value of them. In this case, control unit 213 may change the offset correction variable based on this average value. Alternatively or additionally, control unit 213 may calculate the average value of the existing offset correction variable and the new offset correction variable that is based on the value of the offset error amount ΔI calculated this time, and use this average value as the updated offset correction variable. Alternatively or additionally, when the offset error amount ΔI exceeds a threshold value, control unit 213 may determine that the offset correction would not compensate for the poor electric-current measurement accuracy of current sensor 220, and may stop the motor control that is based on the phase current measurements.

Using the offset correction variable updated in step S107, control unit 213 (offset correction means) performs offset correction on the electric-current measurement of current sensor 220. Then, control unit 213 uses this electric-current current measurement that has undergone offset correction to, for example, perform vector control and measure the magnetic pole position. Below, the processing in steps S102 to S105 (performed by the first sensing means) will be described in detail based on specific examples.

Figure 4:
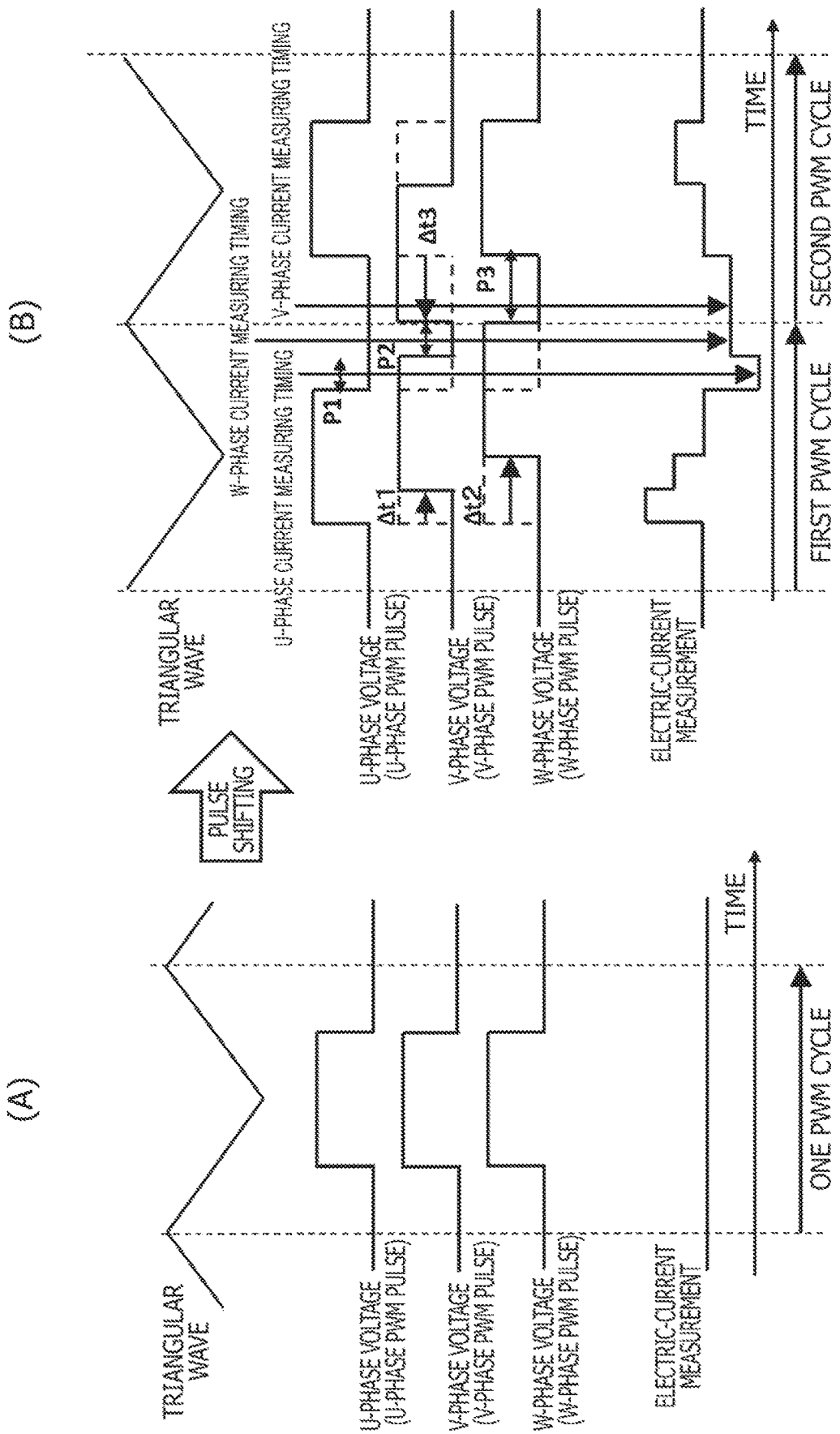
FIGS. 4A and 4B are time charts for illustrating example pulse shifting used when three phase currents are measured in two cycles according to an embodiment of the present invention.

FIGS. 4A and 4B illustrate example pulse shifting and phase current measuring timings used when the three phase PWM pulses (command three phase voltages) have the same width as each other. FIG. 4A illustrates the state before being subjected to pulse shilling (the standard state in which the center of each PWM pulse is located at the valley of the triangular wave carrier). In this state, since the three phase PWM pulses have the same width as each other, the on periods of the three phase PWM pulses perfectly match each other. This means that each PWM cycle includes neither a period in which only one of the U-, V-, W-phase PWM pulses is on nor a period in which only two of the U-, V-, W-phase PWM pulses are on. Thus, current sensor 220 cannot measure a current flowing through any one of the U, V, W phases.

FIG. 4B illustrates example pulse shifting for addressing this situation. In this example pulse shifting, control unit 213 delays the pulse phase of the V-phase PWM pulse by time Δt1, and delays the pulse phase of the W-phase PWM pulse by time Δt2 (Δt2>Δt1) in the first PWM cycle. Specifically, control unit 213 corrects the command voltages using the triangular wave carrier as a reference for timing correction, thereby controlling the rising and falling timings of the PWM pulses and shifting the pulse phases of the PWM pulses.

During a period P1 (of time Δt1) from the falling edge of the U-phase PWM pulse to the falling edge of the V-phase PWM pulse in FIG. 4B, the U-phase PWM pulse is off and the V-phase and W-phase PWM pulses are on, since the delay time Δt2 for the W-phase PWM pulse is longer than the delay time Δt1 for delaying the V-phase PWM pulse. In this period P1, the current having flowed through the V phase and the current having flowed through the W phase join together and flow through the U phase. Thus, control unit 213 establishes the U-phase current measuring timing within the period P1 and samples the output of current sensor 220 at this U-phase current measuring timing, thereby obtaining the U-phase current measurement Iu.

On the other hand, during a period P2 (of time Δt2) from the falling edge of the V-phase PWM pulse to the falling edge of the W-phase PWM pulse in FIG. 4B, the U-phase and V-phase PWM pulses are off and the W-phase PWM pulse is on, since the delay time Δt2 for the W-phase PWM pulse is longer than the delay time Δt1 for delaying the V-phase PWM pulse. In this period P2, the current having flowed through the W phase is divided between the U and V phases. Thus, control unit 213 establishes the W-phase current measuring timing within the period P2 and samples the output of current sensor 220 at this W-phase current measuring timing, thereby obtaining the W-phase current measurement Iw.

In other words, when the three phase PWM pulses have the same width as each other, control unit 213 performs pulse shifting to delay the V-phase PWM pulse by Δt1 and delay the W-phase PWM pulse by Δt2 (Δt2>Δt1) in the first PWM cycle, and measures the U-phase and W-phase currents Iu, Iw in the last half of the first PWM cycle. The pulse shifting performed in the first PWM cycle does not provide a period in which the V-phase current Iv can be measured. Thus, control unit 213 performs pulse shifting in the second PWM cycle, which is immediately after the first PWM cycle, so as to generate a period for measuring the V-phase current Iv.

To generate a period for measuring the V-phase current Iv, control unit 213 performs pulse shifting to advance the pulse phase of the V-phase PWM pulse by time Δt3. By advancing only the V-phase PWM pulse by time Δt3 in the second PWM cycle, control unit 213 generates a period P3 (of time Δt3) during which the U-phase and W-phase PWM pulses are off and the V-phase PWM pulse is on in the first half of the second PWM cycle. In this period P3, the current having flowed through the V phase is divided between the U and W phases. Thus, control unit 213 establishes the V-phase current measuring timing within the period P3 and samples the output of current sensor 220 at this V-phase current measuring timing, thereby obtaining the V-phase current measurement Iv.

In other words, control unit 213 performs pulse shifting to delay the V-phase PWM pulse by Δt3 in the second PWM cycle, and measures the V-phase current Iv in the first half of the second PWM cycle. As a result, in two PWM cycles, that is, in the first and second PWM cycles, all the three phase currents are measured using current sensor 220. The delay times Δt1, Δt2, Δt3 are set so as to make the periods P1, P2, P3 longer than the minimum time required to measure a current. The phase current measuring timings are established near the border between the first and second PWM cycles so as to minimize the time from when U-phase current Iu is measured until when V-phase current Iv is measured.

When the three phase currents are measured in two PWM cycles, that is, in the first and second PWM cycles, as described above, the offset error measurement accuracy decreases along with an increase of the time from when the first of the three phase currents is measured until when the last of the three phase currents is measured. This is because changes in the phase currents over time affect the offset error measurement accuracy. In light of this, two phase currents are measured in the last half of the first PWM cycle and the remaining one phase current is measured in the first half of the second PWM cycle so that all the three phase currents can be measured in a shorter period. In addition, the timings for measuring two phase currents are delayed as much as possible within the last half of the first PWM cycle and the timing for measuring the remaining one phase current is advanced as much as possible within the first half of the second PWM cycle so that all the three phase currents can be measured in a still shorter period.

Figure 5:
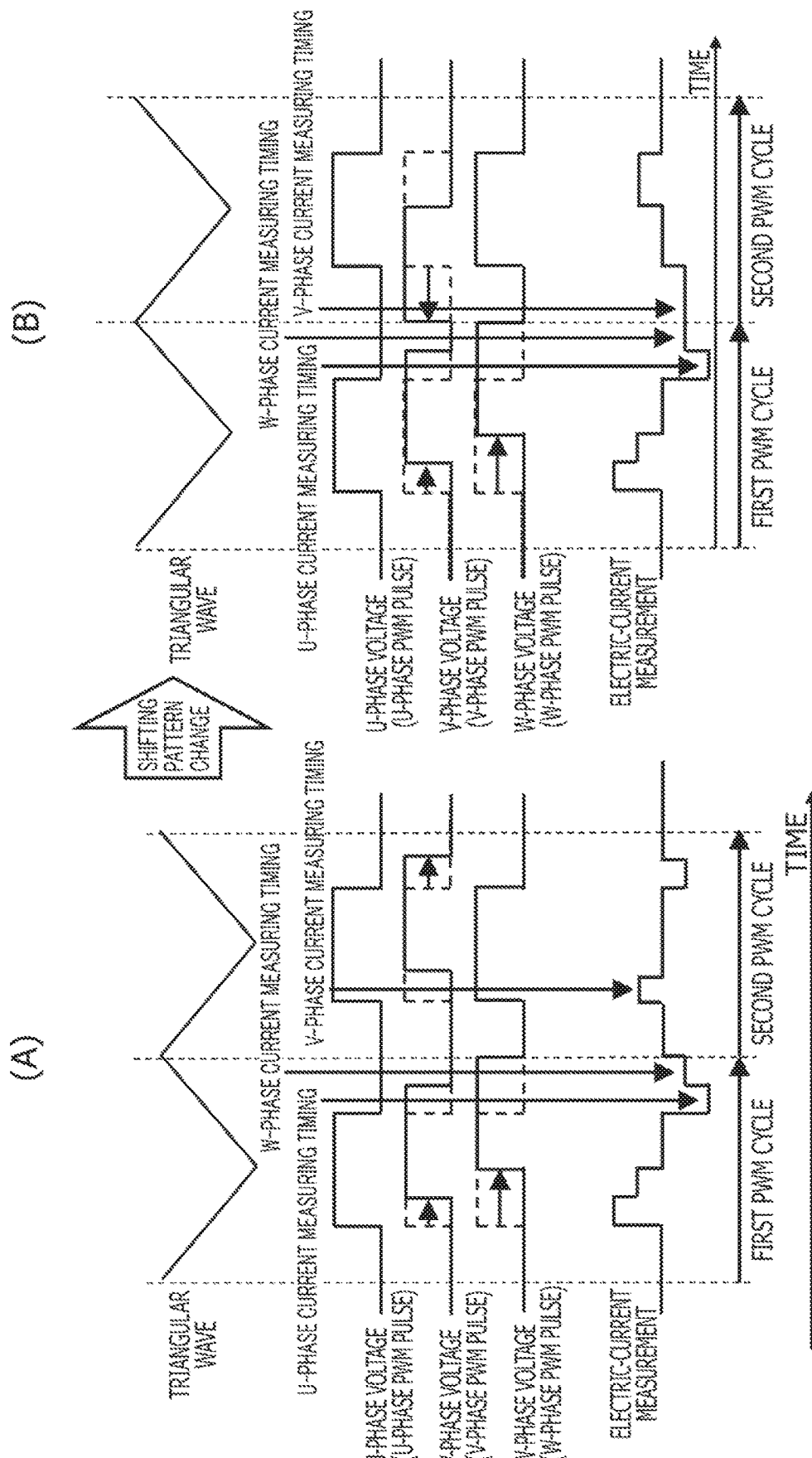
FIGS. 5A and 5B are time charts for illustrating example pulse shifting for measuring three phase currents in two cycles according to an embodiment of the present invention.

If, for example, as illustrated in FIG. 5A, control unit 213 delays the pulse phase of the V-phase PWM pulse in the second PWM cycle so as to generate a period during which the V-phase PWM pulse is off and the U-phase and W-phase PWM pulses are on, the V-phase current Iv can be measured in the first half of the second PWM cycle. However, delaying the pulse phase of the V-phase PWM pulse in the second PWM cycle as illustrated in FIG. 5A delays the timing for measuring the V-phase current Iv as compared to advancing the pulse phase of the V-phase PWM pulse as illustrated in FIG. 5B. Thus, the pulse shifting as illustrated in FIG. 5A increases the duration of the period required to measure all the three phase currents, and will provide poorer offset error measurement accuracy.

Therefore, to allow all the three phase currents to be measured in a shorter time, control unit 213 delays the pulse phases of the PWM pulses such that the phase current measurement periods are generated as late as possible in the first PWM cycle, and advances the pulse phase of the PWM pulse such that the phase current measurement period is generated as early as possible in the second PWM cycle. Note that control unit 213 may use a pulse shifting pattern different from that of FIG. 4B. Specifically, control unit 213 may delay the pulse phases of two of the U, V, W-phase PWM pulses that are different from those in FIG. 4B in the first PWM cycle, and may advance the pulse phase of the remaining phase PWM pulse in the second PWM cycle. For example, control unit 213 may perform pulse shifting to delay the pulse phases of the U-phase and V-phase PWM pulses in the first PWM cycle such that the delay time in the V-phase PWM pulse is longer than that in the U-phase PWM pulse, and may perform pulse shifting to advance the pulse phase of the V-phase PWM pulse in the second PWM cycle. This allows the V-phase and W-phase currents Iv, Iw to be measured in the last half of the first PWM cycle, and allows the U-phase current Iu to be measured in the first half of the second PWM cycle.

Still alternatively, control unit 213 may delay the pulse phase of one the U, V, W-phase PWM pulses in the first PWM cycle, and may advance the pulse phases of the remaining two phase PWM pulses in the second PWM cycle. This allows a one phase current to be measured in the first PWM cycle, and allows the remaining two phase currents to be measured in the second PWM cycle. For example, control unit 213 may perform pulse shifting to delay the pulse phase of the V-phase PWM pulse in the first PWM cycle, and may perform pulse shifting so as to advance the pulse phases of the U-phase and W-phase PWM pulses in the second PWM cycle such that the advancement time in the W-phase PWM pulse is longer than that in the U-phase PWM pulse. This allows the V-phase current Iv to be measured in the first PWM cycle, and allows the U-phase and W-phase currents Iu, Iw to be measured in the second PWM cycle.

Figure 6:
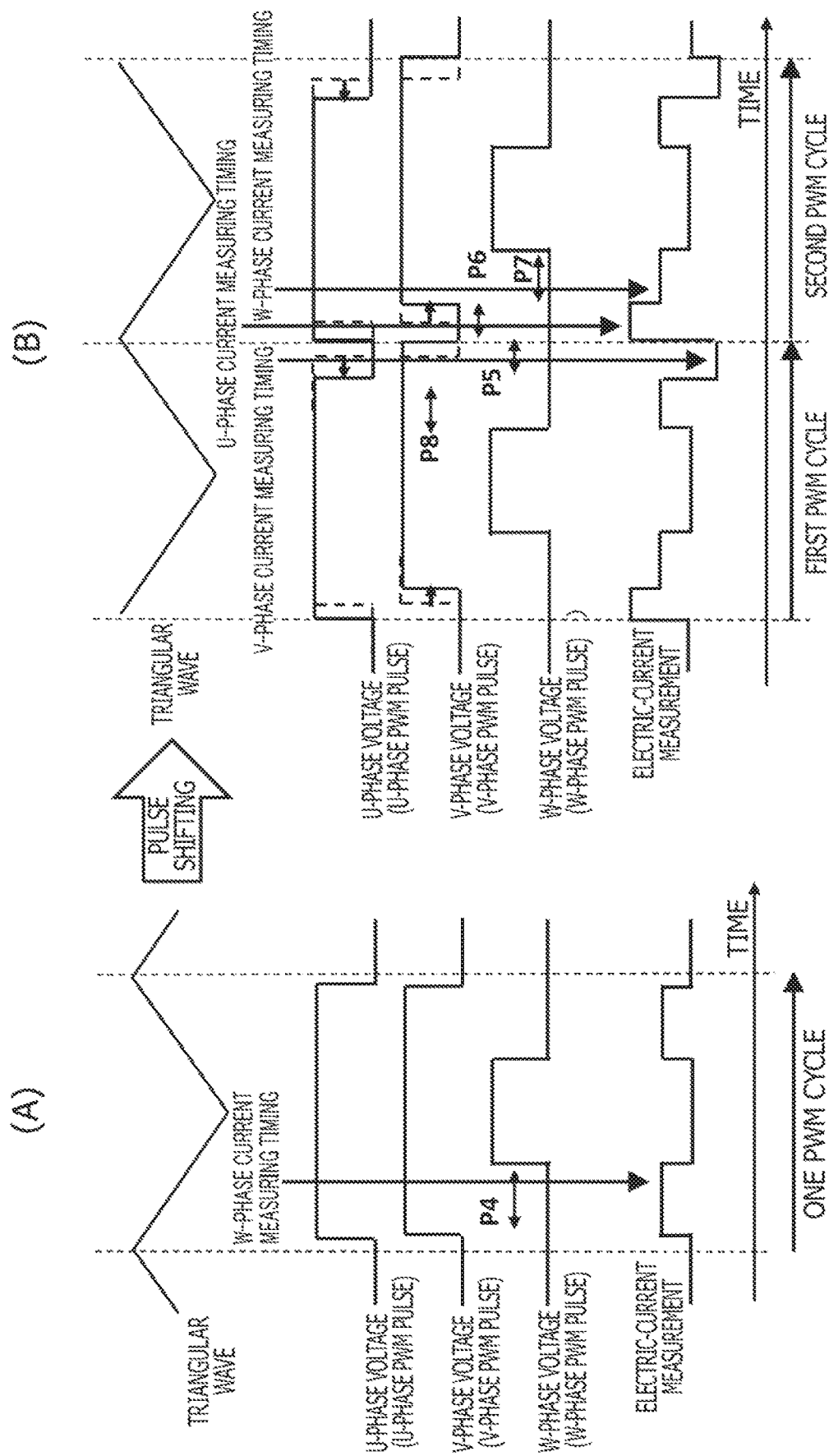
FIGS. 6A and 6B are time charts for illustrating example pulse shifting for measuring three phase currents in two cycles according to an embodiment of the present invention.

FIGS. 6A and 6B illustrate example pulse shifting and phase current measuring timings used when two of the three phase PWM pulses have the same width as each other and the remaining one phase PWM pulse has a different width. In the example illustrated in FIGS. 6A and 6B, the U-phase and V-phase PWM pulses have the same width as each other and the W-phase PWM pulse has a width smaller than that of the U-phase and V-phase PWM pulses.

FIG. 6A illustrates the pulse phases of the three phase PWM pulses before being subjected to pulse shifting. Before being subjected to pulse shifting, the U-phase and V-phase PWM pulses are on and the W-phase PWM pulse is off during a period P4. Thus, in this period P4, the current having flowed through the U phase and the current having flowed through the V phase join together and flow through the W phase, and the W-phase current Iw can be measured from the output of current sensor 220. However, these PWM pulses as generated provide neither a period in which the U-phase current Iu can be measured nor a period in which the V-phase current Iv can be measured.

To address the above, control unit 213 performs pulse shifting as illustrated in FIG. 6B. Specifically, control unit 213 advances the pulse phase of the U-phase PWM pulse in first PWM cycle, and delays the pulse phase of the V-phase PWM pulse in first PWM cycle so as to generate a period P5 during which the V-phase PWM pulse is on and the U-phase and W-phase PWM pulses are off in the last half of the first PWM cycle. Then, control unit 213 measures the V-phase current Iv from the output of current sensor 220 in this period P5.

In addition, in the second PWM cycle immediately after the first PWM cycle, control unit 213 advances the pulse phase of the U-phase PWM pulse and delays the pulse phase of the V-phase PWM pulse. Thereby, control unit 213 generates a period P6 during which only the U-phase PWM pulse is on and a period P7 during which only the W-phase PWM pulse is off. This allows control unit 213 to measure the U-phase current from the output of current sensor 220 in the period P6, and to measure the W-phase current from the output of current sensor 220 in the period P7. Then, control unit 213 measures the U-phase and W-phase currents Iu, Iw in the first half of the second PWM cycle.

In the example of FIG. 6B, control unit 213 not only advances the pulse phase of the U-phase PWM pulse but also delays the pulse phase of the V-phase PWM pulse in the first PWM cycle. This is because, since the U-phase and V-phase PWM pulses have a width close to that of each PWM control cycle in this example, it is difficult to secure a sufficiently long phase current measurement period only by shifting the pulse phase of either the U-phase PWM pulse or the V-phase PWM pulse.

Thus, when the U-phase and V-phase PWM pulses have a width shorter than that in the example of FIGS. 6A and 6B, control unit 213 may be able to measure the V-phase current Iv only by, for example, delaying the pulse phase of the V-phase PWM pulse in the first PWM cycle. Similarly, the purpose of advancing the pulse phase of the U-phase PWM pulse and delaying the pulse phase of the V-phase PWM pulse in the second PWM cycle is to secure a period long enough to measure the U-phase current.

Alternatively, in FIG. 6B, control unit 213 may measure the W-phase current Iw in a period P8 during which only the W-phase PWM pulse is off in the last half of the first PWM cycle. In this case, control unit 213 may measure the V-phase and W-phase currents Iv, Iw in the first PWM cycle, and measure the U-phase current Iu in the second PWM cycle. In the example illustrated in FIGS. 6A and 6B, in which the U-phase and V-phase PWM pulses have the width greater than that of the W-phase PWM pulse, control unit 213 shifts only the pulse phases of the U-phase and V-phase PWM pulses. This allows control unit 213 to measure all the three phase currents in a short period within the time from the last half of the first PWM cycle to the first half of the second PWM cycle, with a shorter delay or advancement time of the pulse phases in pulse shifting.

Figure 7:
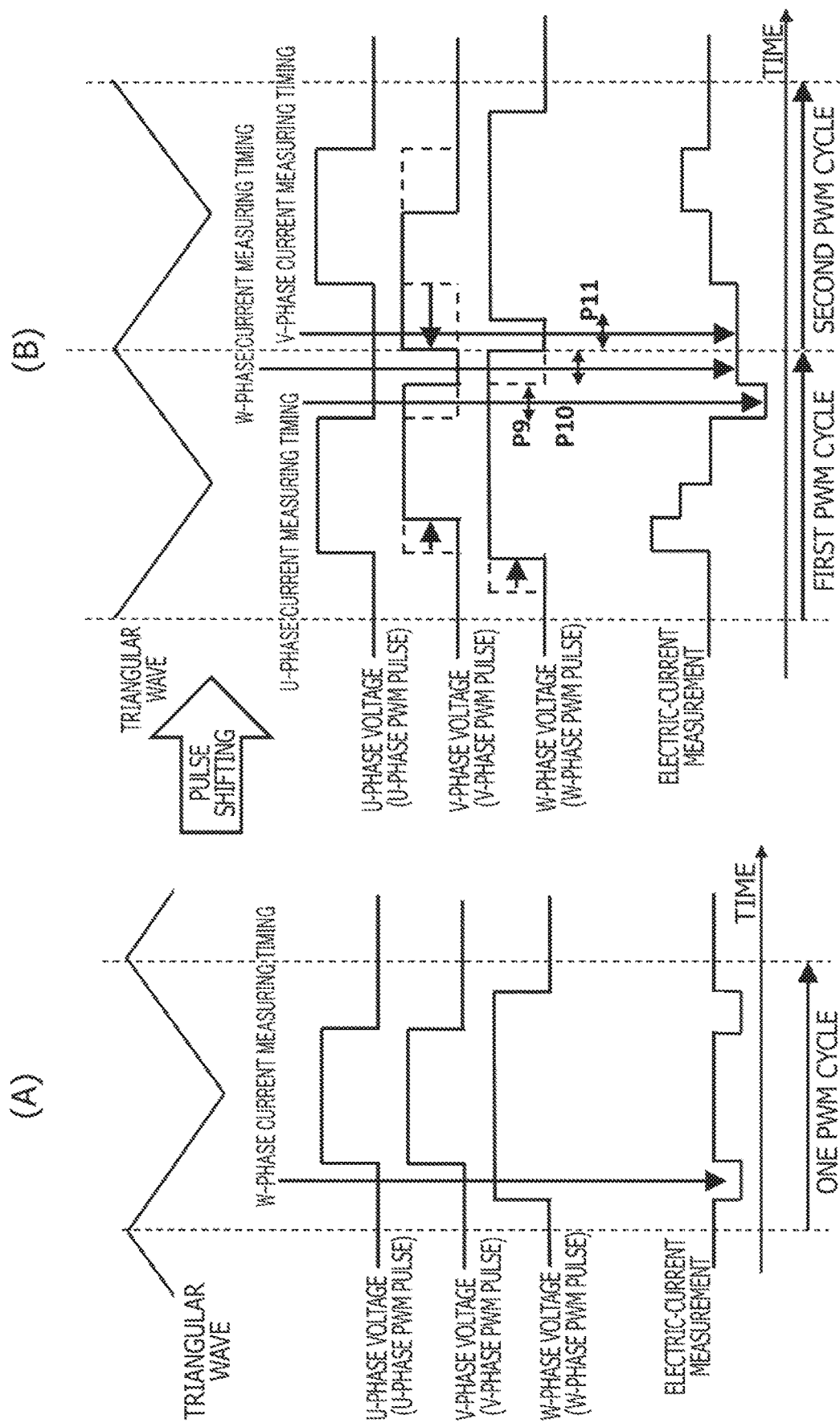
FIGS. 7A and 7B are time charts for illustrating example pulse shifting for measuring three phase currents in two cycles according to an embodiment of the present invention.

When two of the three phase PWM pulses have the same width as each other and the remaining one phase PWM pulse has a width greater than the other two phase PWM pulses, control unit 213 can measure all the three phase currents in two PWM cycles by pulse shifting as exemplified in FIGS. 7A and 7B. FIGS. 7A and 7B illustrate example pulse shifting performed when the U-phase and V-phase PWM pulses have the same width as each other and the W-phase PWM pulse has a width greater than that of the U-phase and V-phase PWM pulses.

In the example illustrated in FIGS. 7A and 7B, control unit 213 delays the pulse phases of the V-phase and W-phase PWM pulses in first PWM cycle so as to generate a period P9 for measuring the U-phase current Iu and a period P10 for measuring the W-phase current Iw. In addition, control unit 213 advances the pulse phase of the V-phase PWM pulse in second PWM cycle so as to locate the rising edge of the V-phase PWM pulse at the start of the second PWM cycle and generates a period P11 for measuring the V-phase current Iv. Note that when conditions such as the widths of the PWM pulses are inadequate to measure all the three phase currents from the output of current sensor 220 in two PWM cycles even after the pulse phases of the PWM pulses are shifted, control unit 213 may cancel updating the offset correction variable.

Figure 8:
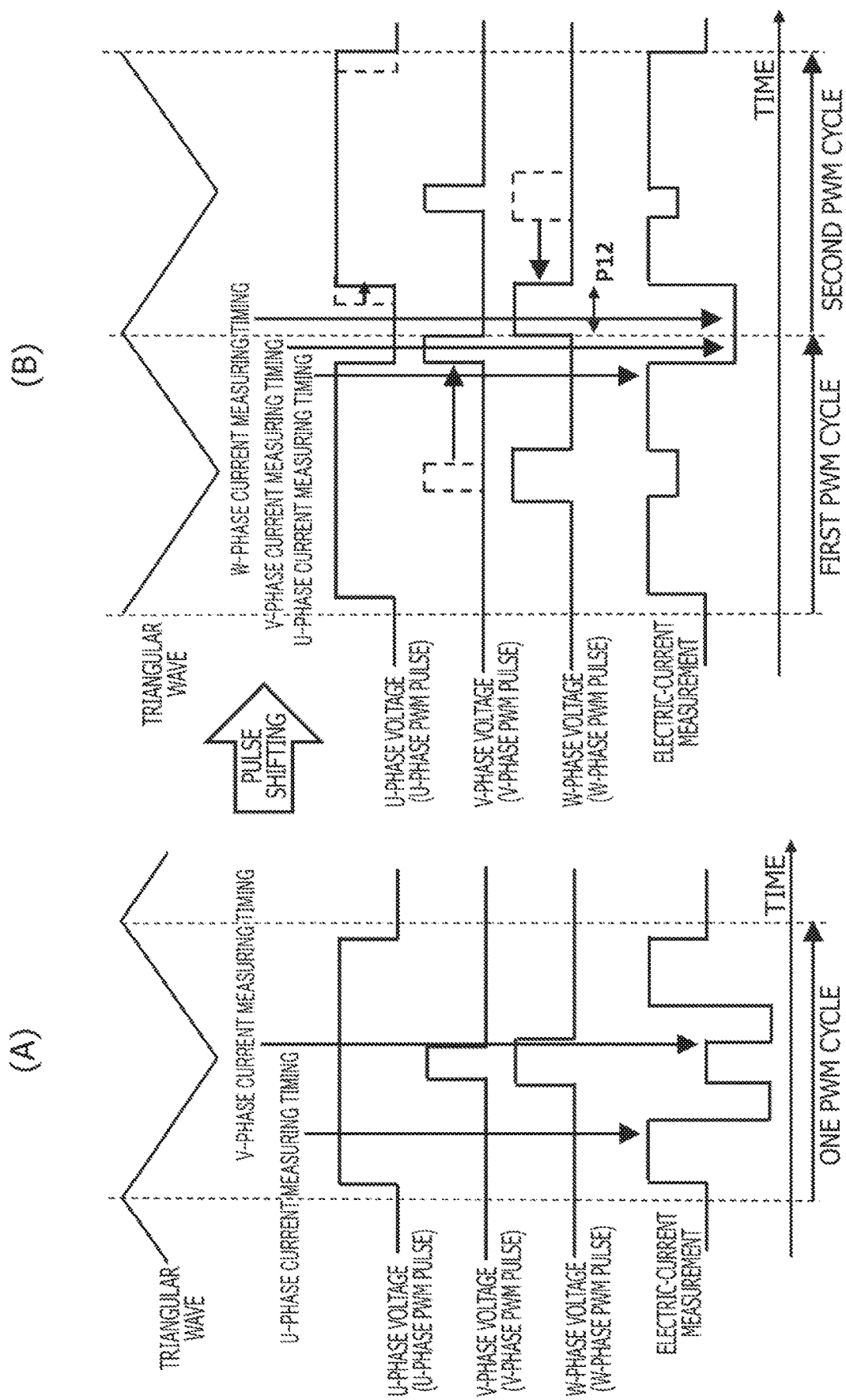
FIGS. 8A and 8B are time charts for illustrating example pulse shifting for measuring three phase currents in two cycles according to an embodiment of the present invention.

FIGS. 8A and 8B illustrate example pulse shifting and phase current measuring timings used when the three phase PWM pulses have different widths from each other. In the example of FIGS. 8A and 8B, the following relationship holds between the widths of the PWM pulses: the width of the U-phase PWM pulse>the width of the W-phase PWM pulse>the width of the V-phase PWM pulse. In addition, the width of the W-phase PWM pulse is close to that of the V-phase PWM pulse.

In this case, in the state before being subjected to pulse shifting as illustrated in FIG. 8A, the PWM pulses provide a period for measuring the U-phase current Iu, but do not provide a period for measuring the W-phase current Iw. Furthermore, these PWM pulses as generated barely provides a period for measuring the V-phase current Iv, but the period is shorter than the minimum time required for measuring a current. To address this, control unit 213 performs pulse shifting as illustrated in FIG. 8B. Specifically, in the first PWM cycle, control unit 213 delays the pulse phase of the V-phase PWM pulse such that its rising edge occurs later than the falling edge of the U-phase PWM pulse. This allows control unit 213 to measure the U-phase and V-phase currents Iu, Iv in the first PWM cycle. In addition, in the second PWM cycle, control unit 213 delays the pulse phase of the U-phase PWM pulse and advances the pulse phase of the W-phase PWM pulse so as to move the on period of the W-phase PWM pulse before the rising edge of the U-phase PWM pulse. This allows control unit 213 to measure the W-phase current Iw in this period P12 during which only the W-phase PWM pulse is on.

Note that, even when the difference between the widths of the W-phase and V-phase PWM pulses is great enough to provide a sufficiently long period for measuring the V-phase current Iv, control unit 213 may perform pulse shifting as illustrated in FIG. 8B. This allows control unit 213 to measure all the three phase currents in a shorter time. Note also that the above examples of pulse shifting for measuring the three phase currents from the output of current sensor 220 are merely illustrative. Thus, it is obvious that any appropriate pulse shifting pattern may be selected according to the widths of the three phase PWM pulses. In other words, in accordance with the widths of the three phase PWM pulses, control unit 213 may select an appropriate pulse shifting pattern that allows one or two phase currents to be measured in the last half of the first PWM cycle and that allows the remaining two or one phase currents to be measured in the first half of the second PWM cycle.

Figure 9:
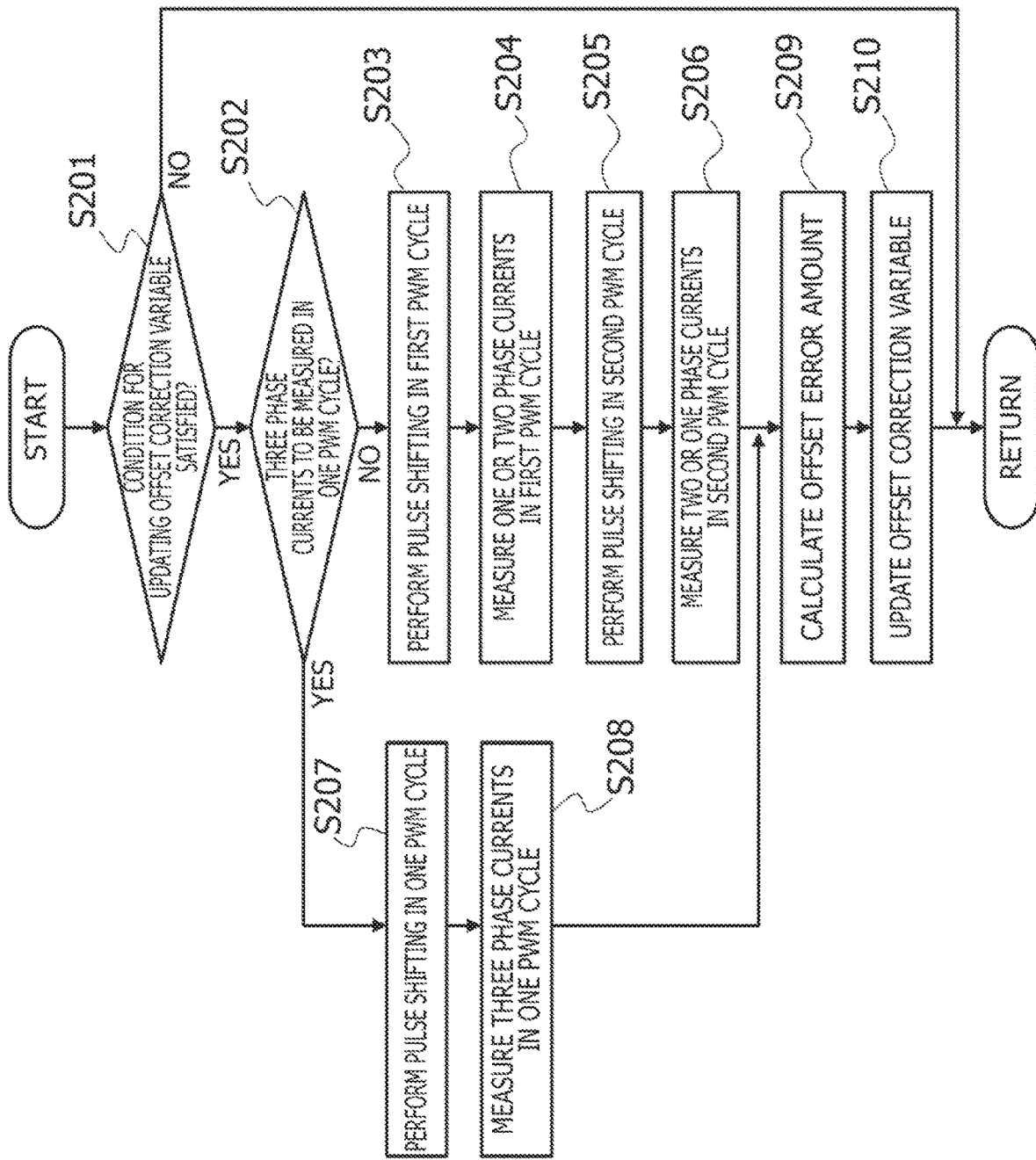
FIG. 9 is a flowchart illustrating processing for learning an offset correction value by selectively performing the step of measuring three phase currents in two cycles or the step of measuring three phase currents in one cycle, according to an embodiment of the present invention.

In the example control illustrated in the flowchart of FIG. 3, control unit 213 measures the three phase currents in two PWM cycles in order to update the offset correction variable. Alternatively, however, control unit 213 may selectively perform the step of measuring the three phase currents in two PWM cycles or the step of measuring the three phase currents in one PWM cycle. The flowchart of FIG. 9 illustrates example control for selectively performing the step of measuring the three phase currents in two PWM cycles (performed by the first sensing means) or the step of measuring the three phase currents in one PWM cycle (performed by the second sensing means).

First, in step S201, control unit 213 determines whether or not the condition for updating the offset correction variable is satisfied. When control unit 213 determines that this condition is satisfied, the operation proceeds to step S202 (performed by the selective activation means). In step S202, based on the widths of the three phase PWM pulses and the like at that time, control unit 213 determines whether the condition for measuring the three phase currents in one PWM cycle is satisfied or the condition for measuring the three phase currents in two PWM cycles is satisfied.

For example, in a first state in which the widths of the three phase PWM pulses are inadequate to measure all the three phase currents in one PWM cycle even after the pulse phases of the PWM pulses are shifted, control unit 213 may determine that a first condition for measuring the three phase currents in two PWM cycles is satisfied. On the other hand, in a second state in which the widths of the three phase PWM pulses are adequate to measure all the three phase currents in one PWM cycle after the pulse phases of the PWM pulses are shifted, control unit 213 may determine that a second condition for measuring the three phase currents in one PWM cycle is satisfied.

Additionally, when the torque command value is constant and the three phase currents are stable, control unit 213 may determine that the second condition for measuring the three phase currents in one PWM cycle is satisfied. On the other hand, when the torque command value fluctuates, control unit 213 may determine that the first condition for measuring the three phase currents in two PWM cycles is satisfied. The reason why the above determination criterion is used in step S202 follows. Since it takes more time to measure all the three phase currents in one PWM cycle than in two PWM cycles, changes in the phase currents over time may reduce the offset error measurement accuracy when the three phase currents are measured in one PWM cycle. However, when the phase currents are stable, the offset error measurement accuracy will not decrease so much even if it takes more time to measure all the three phase currents.

The three phase currents may be measured in one PWM cycle with a smaller computation load than when three phase currents are measured in two PWM cycles. Thus, selectively performing the step of measuring the three phase currents in two PWM cycles or the step of measuring the three phase currents in one PWM cycle as described above may reduce the computation load on control unit 213. Specifically, when the torque command value is constant and the three phase currents are stable, and when the PWM pulses are adequate to measure the three phase currents in one PWM cycle, control unit 213 may determine that the second condition for measuring the three phase currents in one PWM cycle is satisfied. When the second condition is not satisfied, control unit 213 may determine that the first condition for measuring the three phase currents in two PWM cycles is satisfied.

When, in step S202, control unit 213 determines that the first condition for measuring the three phase currents in two PWM cycles is satisfied and the second condition for measuring the three phase currents in one PWM cycle is not satisfied, control unit 213 performs steps S203 to S206 and measures the three phase currents in two PWM cycles. The processing in steps S203 to S206 is the same as that in steps S102 to S105 of the flowchart of FIG. 3, and detailed description thereof will be omitted.

On the other hand, when, in step S202, control unit 213 determines that the first condition for measuring the three phase currents in two PWM cycles is not satisfied and the second condition for measuring the three phase currents in one PWM cycle is satisfied, the operation proceeds to step S207. In step S207, control unit 213 performs pulse shifting so as to measure the three phase currents in one PWM cycle. In the next step S208, control unit 213 establishes the phase current measuring timing in each of the periods for measuring the U-, V-, W-phase currents that are generated by the pulse shifting. This allows control unit 213 to measure the three phase currents in one PWM cycle.

FIGS. 10A and 10B illustrate example pulse shifting for measuring the three phase currents in one PWM cycle and phase current measuring timings in the PWM pulses established as a result of this pulse shifting. FIG. 10A illustrates the three phase PWM pulses before being subjected to the pulse shifting. In this state, the U-phase and V-phase PWM pulses have the same width as each other and the W-phase PWM pulse has a width smaller than that of the U-phase and V-phase PWM pulses.

This pattern of the PWM pulses as generated only provides a period during which the U-phase and V-phase PWM pulses are on and the W-phase PWM pulse is off, so that the W-phase current Iw can be measured, but provides neither a period in which the U-phase current can be measured nor a period in which the V-phase current can be measured. To address this situation, control unit 213 performs pulse shifting as illustrated in FIG. 10B so as to generate periods for measuring the three phase currents within one PWM cycle.

Specifically, control unit 213 advances the pulse phase of the U-phase PWM pulse and delays the pulse phase of the V-phase PWM pulse so as to generate a period during which only the U-phase PWM pulse is on and the U-phase current Iu can be measured at the beginning of one PWM cycle, and generate a period during which only the V-phase PWM pulse is on and the V-phase current Iv can be measured at the end of this one PWM cycle. Then, control unit 213 establishes the timing for measuring the U-phase current Iu within the former of these periods, and establishes the timing for measuring the V-phase current Iv within the latter of these periods. After that, control unit 213 measures the phase currents Iu, Iv from the output of current sensor 220 at these timings.

Figure 10:
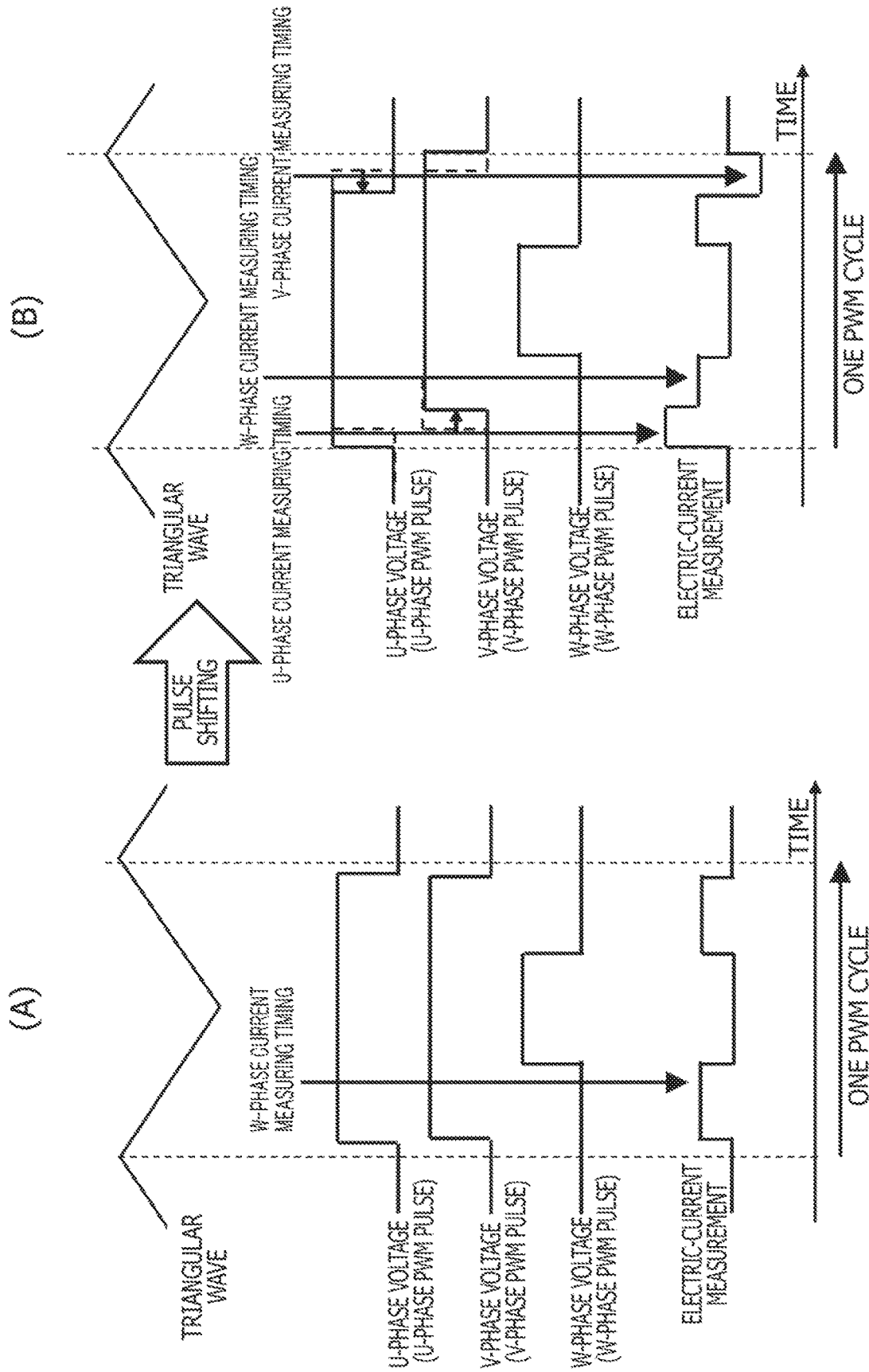
FIGS. 10A and 10B are time charts for illustrating example pulse shifting for measuring three phase currents in one cycle according to an embodiment of the present invention.

Note that the reason control unit 213 shifts the pulse phases of the U-phase and V-phase PWM pulses rather than either of theme is that, in the example of FIG. 10A, it is difficult to secure a sufficiently long phase current measurement period only by shifting the pulse phase of either of them. Control unit 213 establishes the timing for measuring the W-phase current Iw within a period during which the U-phase and V-phase PWM pulses are on and the W-phase PWM pulse is off, so that the W-phase current Iw can be measured, and measures the phase current Iw from the output of current sensor 220 at this timing. Note, although obvious, that the pulse shifting for measuring all the three phase currents in one PWM cycle may be performed in various pulse shifting patterns on various combinations of the widths of PWM pulses besides those illustrated in FIG. 10.

Although the invention has been described in detail with reference to the preferred embodiment, it is apparent that the invention may be modified in various forms by one skilled in the art based on the fundamental technical concept and teachings of the invention. Control unit 213 may use the three phase currents Iu, Iv, Iw measured from the output of current sensor 220 in two PWM cycles to perform vector control on three-phase brushless motor 1.

Furthermore, when measuring the three phase currents from the output of current sensor 220, control unit 213 may perform processing for suppressing the fluctuation of the torque command values (the U-, V-, W-phase command voltages) and measure the three phase currents under the conditions in which the torque command values (the U-, V-, W-phase command voltages) are stable.

REFERENCE SYMBOL LIST

1 Three-phase brushless motor
2 Motor or driving device
212 Driver circuit
212a Inverter
213 Control unit
213a A/D converter
213b Microcomputer
220 Current sensor
220a Shunt resistor
220b Sensor circuit

The invention claimed is:

1. A motor driving device comprising:
an inverter configured to supply AC power to a three-phase brushless motor;
a current sensor configured to measure DC bus current in the inverter; and
a control unit configured to
receive at least one output of the current sensor and perform PWM control on the inverter;
determine each of three phase currents from a respective measured output of the current sensor when a combination of on and off of three phase PWM pulses is a predetermined combination;
perform pulse shifting to shift a pulse phase of a PWM pulse such that pulse phases of the three phase PWM pulses in a first PWM cycle of the PWM control differ from those in a second PWM cycle of the PWM control; and
determine the three phase currents from respective outputs of the current sensor in the two first and second PWM cycles,
wherein the control unit is configured to determine one or two phase currents in a last half of the first PWM cycle, and to determine a remaining two or one phase currents in a first half of the second PWM cycle immediately after the first PWM cycle.

2. A motor driving device according to claim 1, comprising:
an inverter configured to supply AC power to a three-phase brushless motor;
a current sensor configured to measure DC bus current in the inverter; and
a control unit configured to
receive at least one output of the current sensor and perform PWM control on the inverter;
determine each of three phase currents from a respective measured output of the current sensor when a combination of on and off of three phase PWM pulses is a predetermined combination;
perform pulse shifting to shift a pulse phase of a PWM pulse such that pulse phases of the three phase PWM pulses in a first PWM cycle of the PWM control differ from those in a second PWM cycle of the PWM control; and determine the three phase currents from respective outputs of the current sensor in the two first and second PWM cycles, wherein the control unit is further configured to
perform pulse shifting to shift a pulse phase of a PWM pulse and determine the three phase currents from the respective measured outputs of the current sensor in one PWM cycle of the PWM control; and
activate sensing in accordance with whether a condition for activating the sensing is satisfied.

3. The motor driving device according to claim 1, wherein the control unit is configured to perform pulse shifting to delay a pulse phase of a PWM pulse in the first PWM cycle, and perform pulse shifting to advance a pulse phase of a PWM pulse in the second PWM cycle.

4. The motor driving device according to claim 1, wherein the control unit is configured to perform offset correction on an electric-current measurement of the current sensor based on the three phase currents.

5. The motor driving device according to claim 2, wherein the control unit is configured to perform offset correction on an electric-current measurement of the current sensor based on the three phase currents.

6. A method for measuring a phase current in a motor driving device including an inverter for supplying AC power to a three-phase brushless motor, and a current sensor for measuring DC bus current in the inverter, the inverter being controlled by PWM control, the method comprising:
a first step of performing pulse shifting to shift a pulse phase of a PWM pulse in a first PWM cycle of the PWM control to generate one or two phase current measurement periods for determining one or two phase currents in the first PWM cycle;
a second step of determining the one or two phase currents from at least one measured output of the current sensor in the one or two phase current measurement periods generated in the first PWM cycle;
a third step of performing pulse shifting to shift a pulse phase of a PWM pulse in a second PWM cycle of the PWM control to generate two or one phase current measurement periods for determining a remaining two or one phase currents in the second PWM cycle; and
a fourth step of determining the remaining two or one phase currents from the at least one measured output of the current sensor in the two or one phase current measurement periods generated in the second PWM cycle,
wherein
in the first step, pulse shifting to delay a pulse phase of a PWM pulse is performed in the first PWM cycle to generate one or two phase current measurement periods for determining one or two phase currents in a last half of the first PWM cycle, and
in the third step, pulse shifting to advance a pulse phase of a PWM pulse is performed in the second PWM cycle immediately after the first PWM cycle to generate two or one phase current measurement periods for determining a remaining two or one phase currents in a first half of the second PWM cycle.

7. The method for measuring a phase current in the motor driving device according to claim 6, further comprising a fifth step of performing offset correction on an electric-current measurement of the current sensor based on the determined three phase currents.

* * * * *